United States Patent
Vinski et al.

(10) Patent No.: US 11,521,481 B2
(45) Date of Patent: Dec. 6, 2022

(54) SYSTEM FOR MACHINING WORKPIECES

(71) Applicant: HOMAG GmbH, Schopfloch (DE)

(72) Inventors: Marijo Vinski, Glatten (DE); Achim Homeier, Pfalzgrafenweiler (DE)

(73) Assignee: HOMAG GmbH, Schopfloch (DE)

( * ) Notice: Subject to any disclaimer, the term of this patent is extended or adjusted under 35 U.S.C. 154(b) by 212 days.

(21) Appl. No.: 16/611,454

(22) PCT Filed: May 9, 2018

(86) PCT No.: PCT/EP2018/062014
§ 371 (c)(1),
(2) Date: Nov. 6, 2019

(87) PCT Pub. No.: WO2018/206651
PCT Pub. Date: Nov. 15, 2018

(65) Prior Publication Data
US 2021/0142655 A1    May 13, 2021

(30) Foreign Application Priority Data
May 11, 2017  (DE) ..................... 10 2017 207 993.2

(51) Int. Cl.
*G08C 17/02* (2006.01)
*G05B 19/409* (2006.01)

(52) U.S. Cl.
CPC ........... *G08C 17/02* (2013.01); *G05B 19/409* (2013.01); *G05B 2219/45229* (2013.01); *G08C 2201/93* (2013.01)

(58) Field of Classification Search
CPC .. G08C 17/02; G08C 2201/93; G05B 19/409; G05B 2219/45229; Y02P 90/02
See application file for complete search history.

(56) References Cited

U.S. PATENT DOCUMENTS

| | | | |
|---|---|---|---|
| 7,377,302 B2* | 5/2008 | Nakamura | E06B 9/36 160/167 V |
| 2009/0147151 A1 | 6/2009 | Kabasawa et al. | |
| 2012/0024427 A1 | 2/2012 | Gass et al. | |

(Continued)

FOREIGN PATENT DOCUMENTS

| | | |
|---|---|---|
| DE | 102013202754 A1 | 8/2014 |
| DE | 202015106268 U1 | 12/2015 |

(Continued)

*Primary Examiner* — Mohammad Ali
*Assistant Examiner* — Sheela Rao
(74) *Attorney, Agent, or Firm* — Nathan S. Smith; Morgan, Lewis & Bockius LLP

(57) ABSTRACT

The invention relates to a system (1) for machining workpieces, which preferably consist, at least in some sections, of wood, wood materials, plastic or the like, which system comprises a machining device (10) for carrying out the workpiece machining, which machining device has a remote data transfer interface (12), and a terminal (20), which has a remote data transfer interface (22), which is designed to communicate with the remote data transfer interface (12) of the machining device (10) by means of a remote data connection (30). The system is characterized in that the terminal (20) is designed to receive operating commands of a user and to forward said operating commands to the machining device (10) via the remote data transfer interface (22).

13 Claims, 1 Drawing Sheet

(56) References Cited

U.S. PATENT DOCUMENTS

| | | | | |
|---|---|---|---|---|
| 2013/0206730 A1 * | 8/2013 | Furukawa | ............... | B23H 7/04 |
| | | | | 219/69.12 |
| 2015/0375318 A1 * | 12/2015 | Brugger | ............... | B23D 59/008 |
| | | | | 700/192 |
| 2016/0171861 A1 | 6/2016 | Grossman et al. | | |

FOREIGN PATENT DOCUMENTS

| | | |
|---|---|---|
| EP | 0614736 A1 | 9/1994 |
| EP | 1990204 A1 | 11/2008 |
| EP | 2636480 A1 | 9/2013 |
| WO | WO-2010102875 A1 | 9/2010 |
| WO | WO-2016183390 A1 | 11/2016 |

\* cited by examiner

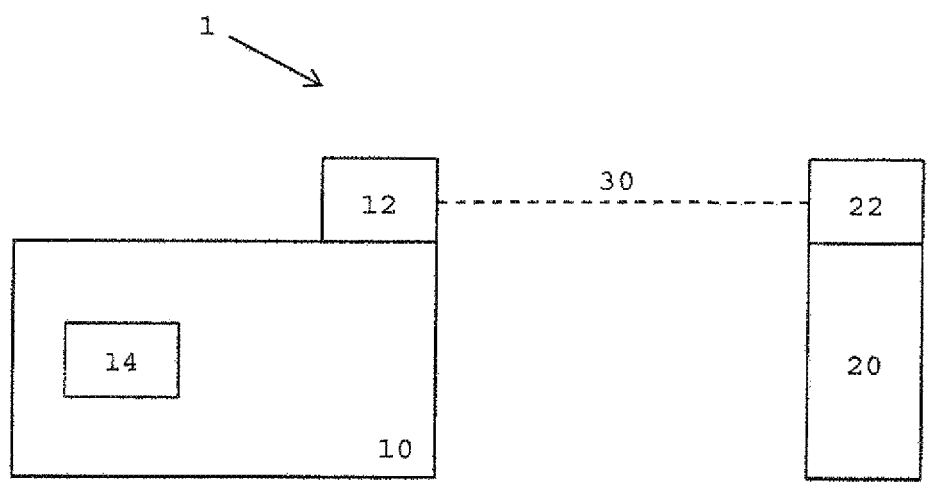

SYSTEM FOR MACHINING WORKPIECES

TECHNICAL FIELD

The invention relates to a system for machining workpieces which preferably consist at least in sections of wood, wood materials, synthetic material or the like, according to the preamble of claim 1.

PRIOR ART

In the furniture and component industry, a wide variety of machining devices are used to perform various machining operations on workpieces. Examples of such machining operations are machining and/or chipping productions such as, for example, formatting, sawing, milling, drilling or the like but also coating processes such as the gluing of edges or coating materials.

Machines of this type usually comprise a machine control, by means of which the operation of the machining device is controlled based on machining data. The machine control is usually operated and monitored by an operator. This leads to considerable additional costs since the operator must be present at the machine controls for the operation and monitoring of the machine and cannot carry out any other activities, or can only carry out other minor activities.

DESCRIPTION OF THE INVENTION

The object of the invention is to provide a system and a method for machining workpieces with improved operating efficiency.

According to the invention, this object is solved by a system for machining workpieces according to claim 1 as well as a method for machining workpieces according to claim 9. Particularly preferred further developments of the invention are given in the dependent claims.

The idea underlying the invention is to spatially decouple the operation of a machining apparatus from the actual machining device. For this purpose, it is provided in accordance with the invention that in a system of this type for machining workpieces, the terminal is configured to receive operating commands of a user and to transmit these to the machining device via a remote data transfer interface.

In this way, the activities of an operator can be decoupled in terms of space, and thus also in terms of time, from the operation of the machining device. As a result hereof, the operating efficiency can be significantly increased since the non-productive and idle times, which an operator so far had to spend at a machining device, can be radically reduced.

The nature and content of the operating commands are not particularly restricted within the scope of the present invention. However, according to a further development of the invention, it is provided that the terminal is configured to receive and transmit operating commands relating to a machine operation control. Alternatively, or in addition, it is also advantageous according to a further development of the invention for the terminal to be configured to receive and transmit operating commands relating to an activation or setting-up of at least one component of the machining device. Thus, operating steps that precede the actual machining operation of the machining device can be efficiently performed by means of the system according to the invention, without the presence of the operator at the machining device being required for this.

A particularly clear example of this are components having time-delayed response characteristics such as, for example, adhesive activation devices. It is a feature of such components that they must, for example, be initially booted, connected, preheated or otherwise activated or set-up, which has, to date, resulted in long waiting for the operator at the machine. According to the invention, these waiting times can be reduced or completely eliminated.

Alternatively, or in addition, according to a further development of the invention, provision is made that the terminal is configured to receive and transmit machining instructions for performing the workpiece machining. In the simplest case, such machining instructions can, for example, simply be the release or confirmation of a machining operation to be performed by the machining device. However, it is also advantageously possible that the machining instructions include machining data for each workpiece to be machined. Thus, depending on the configuration level, partial or even complete remote control of the machining device becomes possible by means of the terminal. This leads to significant increases in efficiency.

According to a preferred embodiment of the invention, the terminal of the system according to the invention moreover cannot only serve as an input device but also as an output device, and can be configured accordingly in order to receive data from the machining device via the remote data transfer interface and to transmit this data to a user. This enables a complete interaction between the operator and the machining device, as a result of which the operating efficiency can be further increased and, additionally, an enhanced operational reliability and a high variety of operation is also made possible.

The terminal of the system according to the invention can be configured in many ways. Advantageously, however, the terminal comprises a mobile terminal that preferably comprises a wirelessly operating remote data transfer interface. This gives the user or the respective operator maximum flexibility, and therefore in addition to operating the machine, the operator can also execute a number of other tasks by means of the terminal. As a result, possible non-productive times can be drastically reduced by this.

According to a further development of the invention, provision is made that the system comprises a communication server, in particular with data storage, which is incorporated into the remote data connection. The functionality and interconnectivity of the system can be further increased by this, in particular if the communication server is configured as a "cloud".

The advantages described above can be realized particularly effectively using the method according to claim 9.

BRIEF DESCRIPTION OF THE DRAWING

FIG. 1 schematically shows an embodiment of the present invention.

DETAILED DESCRIPTION OF PREFERRED EMBODIMENTS

Preferred embodiments of the invention will be described in detail below with reference to FIG. 1 which schematically shows a system 1 for machining workpieces. Further modifications of certain individual features mentioned in this context can be combined with each other to form new embodiments.

The workpieces can be components of wood or different wood or synthetic materials such as are widely used in the furniture and component industry. The system 1 firstly comprises a machining device 10 for performing the actual workpiece machining. This device can be very different machining devices such as, for example, drilling devices, milling devices, coating devices and many other devices. The machining device 10 comprises a remote data transfer interface 12 which serves to enable communication with the terminal 20 schematically shown in FIG. 1. For this purpose, the terminal 20 also comprises a remote data transfer interface 22 configured to communicate with the remote data transfer interface 12 of the machining device 10 via a remote data connection 30.

Within the scope of the present invention, the terminal 20 is configured to receive operating commands of a user and to transmit these to the machining device 10 via the remote data transfer interface 22. These can be very different operating commands, in particular operating commands relating to a machine operation control. In the present embodiment, the machining device 10 comprises a component 14 which, for example, can be an adhesive activation device. In this case, the terminal 20 is configured to receive and transmit operating commands relating to an activation or setting-up of the adhesive activation device. Thus, an operator can, for example, switch on the adhesive activation device 14 by means of the terminal 20 so that the adhesive activation device 14 begins to operate and, for example, is preheated. As a result hereof, it can be ensured that the adhesive activation device 14 and the machining device 10 as a whole are ready for operation at a desired point in time, for example by activating in good time before the desired point in time the respective components by means of the terminal 20. According to the invention, a remote data connection can be used for this purpose, with the result that a considerable increase in efficiency can be achieved.

In the present embodiment, the terminal 20 is also configured to receive data from the machining device 10 via the remote data transfer interface 22 and to transmit this data to the respective operator. This enables the operator to inform himself of the operating state or also possible error messages or a possible need for action with respect to the machining device 10. Due to the remote data transfer connection 30, the user can, in principle, do this from any location and must not be present at the respective machining device. Against this background, the terminal 20 in the present embodiment is also configured as a mobile terminal that comprises a wirelessly operating remote data transfer interface 22. In this case, the interface can be, for example, a WLAN interface, a Bluetooth interface, a mobile communication interface or the like.

Although not shown in FIG. 1, the system can comprise a communication server, in particular with data storage, which is incorporated into the remote data connection. In this way, the functionality and interconnectivity of the system can be further increased, in particular if the communication server is configured as a "cloud".

The operation of the system according to the invention thus includes the establishing of a remote data connection between the terminal 20 and the machining device 10 and the inputting of an operating command into the terminal, which is then transmitted to the machining device via the remote data connection. This enables the operator to act spatially decoupled from the machining device, which results in significant increases in efficiency.

The invention claimed is:

1. A system for machining workpieces comprising:
    a machining device for performing machining the workpieces, wherein the machining device comprises a remote data transfer interface; and
    a terminal comprising a remote data transfer interface configured to communicate with the remote data transfer interface of the machining device via a remote data connection,
    wherein:
    the terminal is configured to receive operating commands of a user and to transmit the operating commands to the machining device via the remote data transfer interface of the terminal;
    the machining device comprises a component with time-delayed response characteristics; and
    the terminal is configured to transmit an activation command to the machining device to switch on the component of the machining device to activate the component before a desired point in time and to have the component ready for operation at the desired point in time.

2. The system according to claim 1, wherein the terminal is configured to receive and transmit operating commands relating to a control of a machine operation.

3. The system according to claim 1, wherein the terminal is configured to receive and transmit operating commands relating to an activation or setting-up of at least one component of the machining device.

4. The system according to claim 1, wherein the terminal is configured to receive and transmit machining instructions for performing machining the workpieces, and wherein the machining instructions include machining data for each workpiece of the workpieces to be machined.

5. The system according to claim 4, wherein the terminal is configured to receive, and transmit to a user, data from the machining device via the remote data transfer interface of the terminal.

6. A method for machining the workpieces using the system according to claim 1, the method comprising:
    establishing the remote data connection between the terminal and the machining device for performing machining the workpieces; and
    inputting an operating command of the operating commands into the terminal and transmitting the operating command to the machining device via the remote data connection.

7. The system according to claim 1, wherein the remote data connection comprises a communication server and a data storage.

8. The system according to claim 1, wherein the remote data transfer interface of the terminal is not a WLAN interface or a Bluetooth interface.

9. The system according to claim 1, wherein the remote data transfer interface of the terminal comprises a wirelessly operating mobile communication interface.

10. The system according to claim 1, wherein the terminal is configured to receive an error message from the machining device.

11. The system according to claim 1, wherein the component comprises an adhesive activation device.

12. The system according to claim 11, wherein the terminal is configured to transmit the activation command to the machining device to switch on the adhesive activation device to preheat the adhesive activation device prior to the desired point in time.

13. The system according to claim 1, wherein the remote data connection comprises a cloud.

* * * * *